United States Patent
Orbach et al.

(10) Patent No.: US 12,001,797 B2
(45) Date of Patent: Jun. 4, 2024

(54) SYSTEM AND METHOD OF AUTOMATIC TOPIC DETECTION IN TEXT

(71) Applicant: GENESYS CLOUD SERVICES, INC., Daly City, CA (US)

(72) Inventors: Eyal Orbach, Tel-Aviv (IL); Avraham Faizakof, Tel-Aviv (IL); Arnon Mazza, Tel-Aviv (IL); Lev Haikin, Tel-Aviv (IL)

(*) Notice: Subject to any disclaimer, the term of this patent is extended or adjusted under 35 U.S.C. 154(b) by 379 days.

(21) Appl. No.: 17/318,524

(22) Filed: May 12, 2021

(65) Prior Publication Data

US 2022/0382982 A1    Dec. 1, 2022

(51) Int. Cl.
G06F 40/289    (2020.01)
G06F 16/2458   (2019.01)
G06F 16/248    (2019.01)
G06N 3/04      (2023.01)

(52) U.S. Cl.
CPC ........ G06F 40/289 (2020.01); G06F 16/2468 (2019.01); G06F 16/248 (2019.01); G06N 3/04 (2013.01)

(58) Field of Classification Search
None
See application file for complete search history.

(56) References Cited

U.S. PATENT DOCUMENTS

| | | | | |
|---|---|---|---|---|
| 9,715,495 B1* | 7/2017 | Tacchi | | G06F 40/30 |
| 2016/0292157 A1* | 10/2016 | Zhang | | G06Q 50/10 |
| 2019/0325029 A1 | 10/2019 | Gandhi et al. | | |
| 2020/0184339 A1 | 6/2020 | Li et al. | | |
| 2020/0293902 A1 | 9/2020 | Li et al. | | |
| 2021/0089931 A1* | 3/2021 | Bellec | | G06F 16/3329 |
| 2021/0097145 A1* | 4/2021 | Roy | | G06F 40/279 |
| 2021/0209500 A1* | 7/2021 | Hu | | G06N 5/04 |
| 2022/0261545 A1* | 8/2022 | Lauber | | G06F 16/355 |
| 2022/0292123 A1* | 9/2022 | Hoppe | | G06F 16/319 |

OTHER PUBLICATIONS

Atif Khan, Qaiser Shah, M. Irfan Uddin, Fasee Ullah, Abdullah Alharbi, Hashem Alyami, Muhammad Adnan Gul, "Sentence Embedding Based Semantic Clustering Approach for Discussion Thread Summarization", Complexity, vol. 2020, Article ID 4750871, 11 pages, 2020. https://doi.org/10.1155/2020/4750871 (Year: 2020).*

(Continued)

*Primary Examiner* — Richemond Dorvil
*Assistant Examiner* — Alexander G Marlow

(57) ABSTRACT

A method and system for automatic topic detection in text may include receiving a text document of a corpus of documents and extracting one or more phrases from the document, based on one or more syntactic patterns. For each phrase, embodiments of the invention may: apply a word embedding neural network on one or more words of the phrase, to obtain one or more respective word embedding vectors; calculate a weighted phrase embedding vector, and compute a phrase saliency score, based on the weighted phrase embedding vector. Embodiments of the invention may subsequently produce one or more topic labels, representing one or more respective topics in the document, based on the computed phrase saliency scores, and may select one or more topic labels according to their relevance to the business domain of the corpus.

15 Claims, 9 Drawing Sheets

(56) References Cited

OTHER PUBLICATIONS

Chris Emmery "Euclidean vs. Cosine Distance" retrieved from https://cmry.github.io/notes/euclidean-v-cosine (Year: 2017).*

R. Alqaisi, W. Ghanem and A. Qaroush, "Extractive Multi-Document Arabic Text Summarization Using Evolutionary Multi-Objective Optimization With K-Medoid Clustering," in IEEE Access, vol. 8, pp. 228206-228224, 2020, doi: 10.1109/ACCESS.2020.3046494. (Year: 2020).*

Kazuma Hashimoto, Georgios Kontonatsios, Makoto Miwa, Sophia Ananiadou, "Topic detection using paragraph vectors to support active learning in systematic reviews" Journal of Biomedical Informatics, vol. 62, pp. 59-65, ISSN 1532-0464, https://doi.org/10.1016/j.jbi.2016.06.001. (Year: 2016).*

Salima Lamsiyah, Abdelkader El Mahdaouy, Bernard Espinasse, Saïd El Alaoui Ouatik, "An unsupervised method for extractive multi-document summarization based on centroid approach and sentence embeddings", Expert Systems with Applications, vol. 167, https://doi.org/10.1016/j.eswa.2020.114152. (Year: 2021).*

Sanjeev Arora, Yingyu Liang, Tengyu Ma, "A Simple but Tough-to-Beat Baseline for Sentence Embeddings", International Conference on Learning Representations (Year: 2017).*

Xu, D., Tian, Y. A Comprehensive Survey of Clustering Algorithms. Ann. Data. Sci. 2, 165-193 (2015). https://doi.org/10.1007/s40745-015-0040-1 (Year: 2015).*

PCT International Search Report and Written Opinion regarding co-pending PCT application No. PCT/US2021/032007 dated Feb. 7, 2022.

* cited by examiner

SYSTEM AND METHOD OF AUTOMATIC TOPIC DETECTION IN TEXT

FIELD OF THE INVENTION

The present invention relates generally to the field of natural language processing (NLP). More specifically, the present invention relates to methods and systems for analyzing text.

BACKGROUND OF THE INVENTION

Contact centers engage in many interactions with their customers. Customer interactions may vary significantly in their format, e.g., phone calls, chat rooms, emails, text documents, web pages, and the like. Customer interactions may also vary in their subject matters, and may include for example complaints, required assistance, general questions, etc.

Analyzing large amounts of interactions (e.g., in the order of thousands per day) can be made more efficient with an automatic system, which is commonly referred to as a topic detection system. Topic detection systems may find and measure a frequency of recurring topics, and may group related topics and sub-topics according to their subject matter.

Currently available topic detection systems that find recurring topics or concepts throughout a corpus of customer interactions are prone to noise, leading to detection of topics that are not necessarily of interest to the topic detection system's end user or analyst, as commonly referred to in the art.

An example for such noise in an organizational contact center may include, for example recurring phrases, that may not be relevant to the organization's line of business, or that may not be related to the interaction's core subject matter. A common practice to filter such terms or phrases is by maintaining an "allow-list" and/or a "deny-list", that may be manually predefined and/or updated. However, such rigid solutions may not handle new or unexpected terms or phrases well.

SUMMARY OF THE INVENTION

The following table, Table 1 may be used herein as a reference to term or expressions as used herein.

TABLE 1

| | |
|---|---|
| Document, Interaction | The terms "document" and "interaction" may be used herein interchangeably to refer to a data element that may represent textual information, and may be subject to textual analysis by embodiments of the invention. Such documents or interaction may vary in format, and may include for example phone calls, chat rooms, emails, text documents, web pages, and the like. |
| Phrase, Fragment | The terms "phrase" and "fragment" may be used herein interchangeably to refer to a combination of one or more words included in an interaction or document. |
| Salience | The term "salience" may be used herein in a context of a specific phrase or fragment in an interaction, to indicate an extent to which that phrase relates to the core subject matter of the interaction. |
| Contact centers, Tenants | The terms "contact centers" and "tenants" may be used herein interchangeably to refer to a client-facing interface of an organization, through which documents or interactions may be received, and subsequently analyzed by embodiments of the invention. For example, a first tenant may pertain to an internet provider, and a second tenant may pertain to a car rental agency. |
| Domain, Business domain | The term "business domain" or simply "domain" may be used herein to refer to a context or type pertaining to specific tenants. In the above example, a first domain may be an aggregation of internet providers, and a second domain may include multiple car rental agencies.<br><br>It may be appreciated that the semantic meaning of phrases may change among domains. For example, in the domain of the first tenant (e.g., the internet provider), the phrase "internet speed" may indicate a complaint that is related to the tenant's core business, and should be treated accordingly, whereas in the domain of the second tenant (e.g., the car rental agency), the same phrase may not be cause for alarm. Embodiments of the invention may perform topic identification that is domain specific, so as to find and/or present the most relevant topics, per each domain. |
| Relevance | The term "relevance" may be used herein in a context of a specific phrase or fragment to indicate an extent at which the phrase may relate to a specific business domain, or a specific tenant's core business. |
| Topic, Concept | The terms "topic" and "concept" may be used herein interchangeably in relation to one or more specific documents or interactions to refer to an idea or a subjects that may be discussed or included in the documents, and may be labeled or highlighted by embodiments of the invention. |
| Topic label, Label | The term "topic label" or simply "label" may be used herein to refer to a phrase that may represent a topic or concept in a document. A topic label may be identical, or similar in meaning, to a phrase included in the respective document. For example, a first document may include the phrase "technical assistance", whereas a second document may include the phrase "technical help". In this example, embodiments of the invention may attribute both the first document and the second document with the same topic label, e.g., "technical assistance". |

A method and system for automatic assessment and filtering of topic labels, detected by topic detection systems is therefore required.

As elaborated herein, embodiments of the invention may improve the quality or relevance of concepts or topics found by topic detection systems by (a) assessing the salience or quality of phrases included in the interaction, and filtering out low-quality phrases, and (b) assessing relevance of the remaining phrases in the context of a specific, relevant business domain.

According to some embodiments, in a first stage, embodiments of the invention may leverage dynamics of an interaction to mark or select phrases that have high probability to be salient to the interaction, in a sense that they may be most related to the core subject matter of the interaction. For example, in this first stage, embodiments of the invention may filter-out phrases such as "friend of mine", "feel free", "bear with me just a moment" and "name and telephone number", which may lack saliency in an interaction's context.

Additionally, in a second stage, embodiments of the invention may leverage the settings of a multi-tenant, cloud-based infrastructure, to find which concepts portrayed in the interaction have higher probability to be relevant to the specific tenant's line of business. For example, in this second stage, embodiments of the invention may filter-out topics or concepts such as "collecting information", "managing resources", and "answering questions" that may not be relevant, or may be too general and non-informative in the context of a specific tenant.

As elaborated herein, embodiments of the invention may integrate the filtration of phrases according to saliency, and the filtration of concepts according to relevance into a system that may analyze tenant interactions, and facilitate exploration of recurring topics that are of interest to the tenant (e.g., a user or analyzer of a call center).

Embodiments of the invention may include a method of automatic topic detection in text by at least one processor. Embodiments of the method may include receiving at least one first text document of a first plurality of text documents, extracting one or more phrases from the first text document, where each phrase may include one or more words, based on one or more syntactic patterns.

For each phrase, embodiments of the invention may apply a word embedding neural network (NN) on one or more words of the phrase, to obtain one or more respective word embedding vectors. The one or more word embedding vectors may be adapted to encode a meaning of the one or more corresponding words of the phrase. Embodiments may then calculate a weighted phrase embedding vector, based on the one or more word embedding vectors, and compute a phrase saliency score, based on the weighted phrase embedding vector. Embodiments of the invention may subsequently produce one or more topic labels, representing one or more respective topics of the at least one first text document, based on the computed phrase saliency scores.

Embodiments of the invention may calculate a weighted phrase embedding vector by calculating, for each word of the phrase, a word weight value, based on frequency of appearance of the word in the first plurality of text documents; and calculating the weighted phrase embedding vector as a weighted average of the relevant word embedding vectors, based on the relevant word weight values.

Embodiments of the invention may compute a phrase saliency score by arranging the one or more phrases as vertices in an undirected phrase graph, wherein each pair of vertices may be connected by an edge; for one or more edges, computing a similarity weight that represents semantic similarity between two phrases of corresponding connected vertices; and for each phrase, computing a phrase saliency score, based on the similarity weights of the connected edges.

Embodiments of the invention may assign a similarity weight that represents semantic similarity between two phrases by calculating a cosine similarity value between word embedding vectors of the two phrases; and attributing the cosine similarity value as a similarity weight to an edge that connects the vertices of the two phrases.

Embodiments of the invention may compute a phrase saliency score in an iterative process, wherein each iteration may include computing a phrase saliency score of a first phrase, based on: (a) the similarity weights of edges connected to the respective vertex, and (b) a phrase saliency score of at least one second phrase; and updating the phrase saliency score of the at least one second phrase, based on the computed phrase saliency score of the first phrase.

Embodiments of the invention may produce one or more topic labels by obtaining a plurality of phrases, and a respective plurality of phrase saliency scores from the first plurality of documents; selecting a first subset of the plurality of phrases, corresponding to the top phrase saliency scores; and clustering the subset of phrases into clusters, based on the calculated cosine similarity value, wherein each cluster represents a unique topic label.

According to some embodiments of the invention, the first plurality of documents pertains to a first business domain. Embodiments of the invention may obtain a second plurality of documents pertaining to at least one second business domain, and for each topic label: calculate a foreground probability value, representing probability of the topic label to represent a topic comprised in the first plurality of documents; calculate a background probability value, representing probability of the topic label to represent a topic comprised in one of the first plurality of documents and the second plurality of documents; and calculate a relevance score, representing pertinence of the topic label to the first business domain, based on the foreground probability value and the background probability value.

Embodiments of the invention may calculate a foreground probability value by performing a fuzzy search of the topic label, to count a number N1 of documents of the first plurality of documents that comprise the relevant topic; and calculating the foreground probability value as a ratio between N1 and a number of documents included in the first business domain.

Embodiments of the invention may calculate a background probability value by performing a fuzzy search of the topic label, to count a number N2 of documents of the first plurality of documents and the second plurality of documents, that comprise the relevant topic; and calculating the background probability value as a ratio between N2 and the number of documents included in the first business domain and the at least one second business domain.

Embodiments of the invention may receive, via a user interface (UI) at least one query, in relation to a topic present in the first plurality of documents; and produce a response to the query, based on the one or more relevant topic labels. Additionally, or alternatively, Embodiments of the invention may produce the response to the query, based on the one or more topic labels and corresponding relevance scores.

Embodiments of the invention may include a system for automatic topic detection in text. Embodiments of the system may include: a non-transitory memory device, wherein modules of instruction code may be stored, and at least one processor associated with the memory device, and configured to execute the modules of instruction code.

Upon execution of said modules of instruction code, the at least one processor may be configured to: receive a first text document of a first plurality of text documents; extract one or more phrases from the first text document, where each phrase may include one or more words, based on one or more syntactic patterns.

For each phrase, embodiments of the system may apply a word embedding NN on one or more words of the phrase, to obtain one or more respective word embedding vectors; calculate a weighted phrase embedding vector, based on the one or more word embedding vectors; and compute a phrase saliency score, based on the weighted phrase embedding vector.

Embodiments of the system may subsequently produce one or more topic labels, representing one or more respective topics of the at least one first text document, based on the computed phrase saliency score of each phrase.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
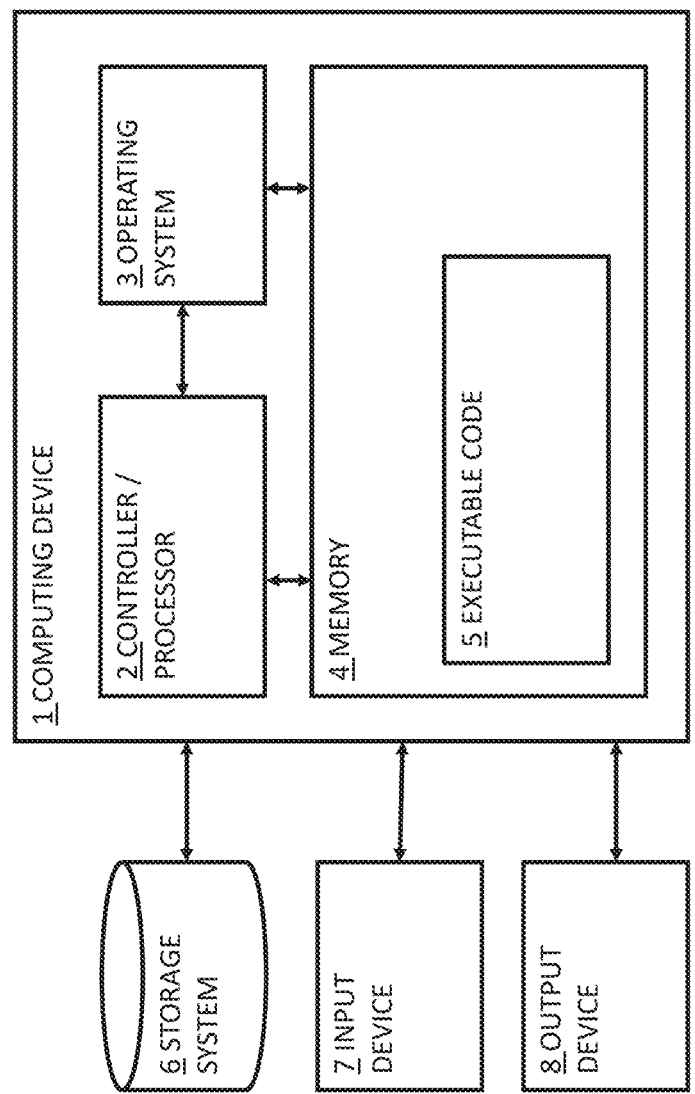
FIG. 1 is a block diagram, depicting a computing device which may be included in a system for automatic topic detection in text according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for performing text analysis, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may perform text analysis as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to text analysis may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Figure 2:
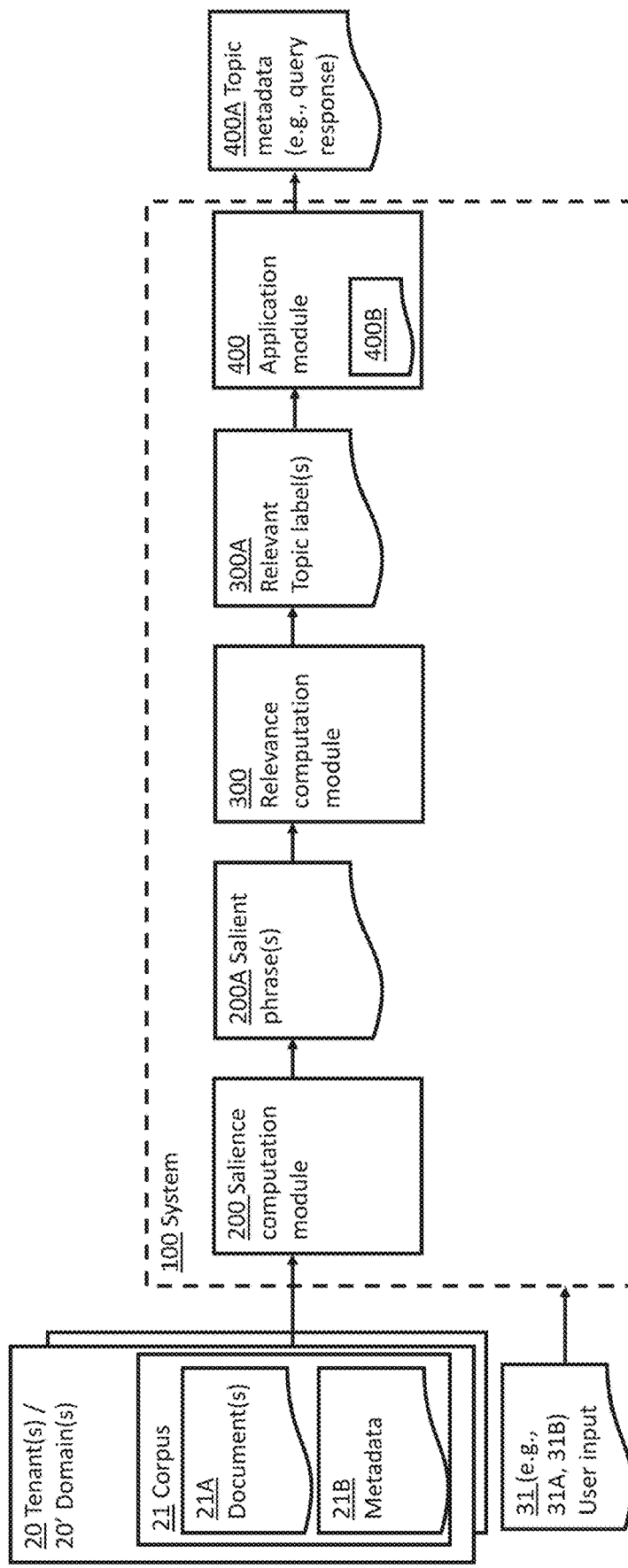
FIG. 2 is a block diagram, depicting an overview of a system for automatic topic detection in text, according to some embodiments of the invention.

Reference is now made to FIG. 2, which depicts an overview of a system for automatic topic detection in text, according to some embodiments of the invention.

According to some embodiments of the invention, system 100 may be implemented as a software module, a hardware module, or any combination thereof. For example, system 100 may be, or may include a computing device such as element 1 of FIG. 1, and may be adapted to execute one or more modules of executable code (e.g., element 5 of FIG. 1) to perform text analysis, as further described herein.

As shown in FIG. 2, arrows may represent flow of one or more data elements to and from system 100 and/or among modules or elements of system 100. Some arrows have been omitted in FIG. 2 for the purpose of clarity.

As shown in FIG. 2, system 100 may include a salience computation module 200, adapted to receive at least one text document data element 21A. Text document 21A may be associated with, or included in a plurality, group or corpus 21, as commonly referred to in the art, relating to a specific organization or tenant 20 (e.g., a specific car rental agency) and/or to a corpus 21 pertaining to a domain 20' of similar organizations or tenants (e.g., a plurality of car rental agencies).

According to some embodiments, and as elaborated herein, salience computation module 200 may extract one or more phrases or fragments from the text document 21A, based on one or more syntactic patterns. Each fragment may include one or more words, such as a group of adjacent or related words in text document 21A. Salience computation module 200 may subsequently calculate a salience score of one or more extracted phrases or fragments.

According to some embodiments, salience computation module 200 may select a portion or percentage of phrases corresponding to the highest-ranking salience scores, as elaborated herein. Additionally, or alternatively salience computation module 200 may select a subset of phrases having scores that surpass a predefined threshold, as elaborated herein. These selected phrases are denoted "salient phrases 200A" in FIG. 2.

As shown in FIG. 2, system 100 may include a relevance computation module 300, adapted to receive one or more selected, salient phrases 200A, and produce therefrom one or more initial labels or indicators of topics that are discussed or included in the at least one document 21A, as elaborated herein. Relevance computation module 300 may subsequently analyze the initial labels to determine a relevance score of one or more (e.g., each) candidate topic in the context of the specific tenant 20 and/or domain 20'. Relevance computation module 300 may then mark or select a subset or portion of topic labels, corresponding to the highest relevance scores (e.g., scores surpassing a predefined threshold), as representing at least one topic included in document 21A. These selected topic labels are denoted "relevant topic labels 300A" in FIG. 2.

According to some embodiments, system 100 may include or store salient phrases 200A and/or relevant topic labels 300A as a topic data structure 400B (e.g., a table, a linked list and the like) on a database or on a storage or memory device (e.g., storage system 6 of FIG. 1). For example, each entry in topic data structure 400B may associate a specific document 21A with one or more respective salient phrases 200A and/or relevant topic labels 300A.

System 100 may utilize topic data structure 400B to provide, e.g., to a user or an application running on a computing device (e.g., computing device 1 of FIG. 1) one or more topic metadata 400A data elements pertaining to document 21A. For example, a user may present a database query to system 100, regarding content of topics in a plurality of documents 21A, such as: "which documents discuss the topic of a specific technical problem". System 100 may respond to the query with a query response that includes topic metadata 400A. In this example, system 100 may include in this query response 400A a list of titles, or pointers to documents 21A that discuss the specific technical issue.

As known in the art, currently available systems for topic detection may attempt to find recurring topics in a corpus of documents by clustering similar phrases together, with the help of some form of similarity metric. The clustering methods and the similarity metric may vary among different implementations. The output of such a process is a set of labels representing specific topics. It may be appreciated that the set of topic labels should be formed so as to maximize a variety (or minimal similarity) between labels, and that each label would be a topic that is of interest to the end user. In the example of contact center interactions, this means that a user would be interested to see metadata pertaining to relevant topics, such as the volume of interactions including a specific topic, their change over time, and locate specific interactions that include this topic.

Currently available systems for topic detection may employ a naive approach, in which an input for the topic detection process may be a complete text of each interaction, (e.g., in the form of N-grams or syntactic patterns).

Embodiments of the invention may include an improvement over currently available text analysis technology. By (a) filtering-out less salient text from the input documents, to obtain salient phrases 200A, and (b) performing the analysis of relevance to obtain relevant topic labels 300A, based on the most salient phrases, embodiments may improve the outcome set of topic labels, as elaborated herein. For example, embodiments of the invention may minimize similarity between topic labels of the output set of topic labels. Additionally, embodiments of the invention may better select and present (e.g., to an analyzer) topic labels that are most relevant to a specific tenant 20 and/or domain 20', as elaborated herein.

Figure 3A:
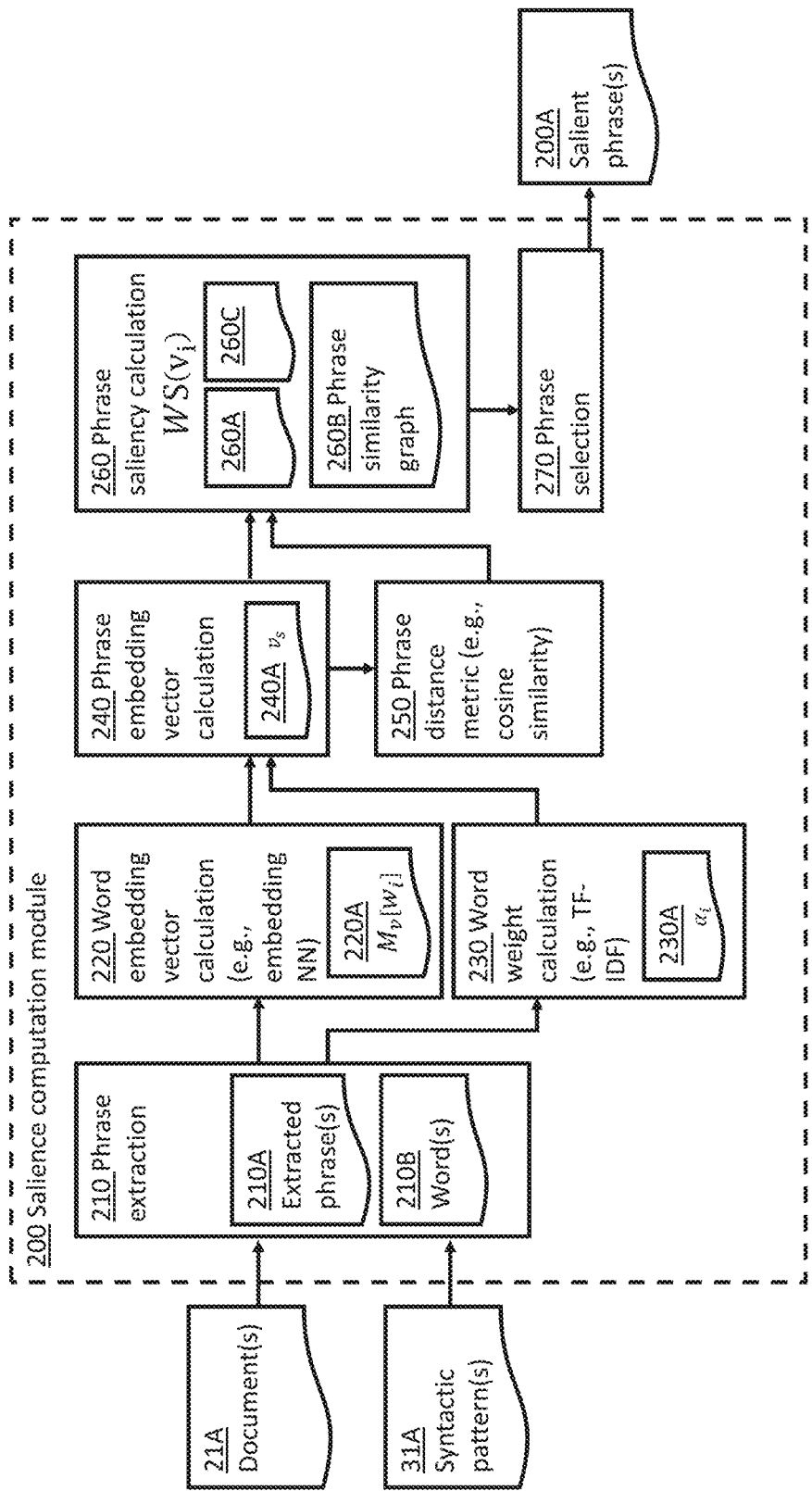
FIG. 3A is a block diagram, depicting a salience computation module, which may be included in a system for automatic topic detection in text, according to some embodiments of the invention.

Reference is now made to FIG. 3A, which is a block diagram, depicting a salience computation module 200, which may be included in system 100 for automatic topic detection in text, according to some embodiments of the invention.

As shown in FIG. 3A, salience computation module 200 (or module 200, for short) may include a phrase extraction module 210. Phrase extraction module 210 may be adapted to receive: (a) at least one text document 21A, and (b) one or more syntactic patterns or rules 31A. The one or more syntactic patterns 31A may be, or may include a data structure such as a table, that may be kept or stored in a database (e.g., in storage device 6 of FIG. 1). As known in the art, the one or more syntactic patterns 31A may associate one or words to grammatical roles in a sentence of a human language (e.g., English, Spanish, etc.), and may thus decode a grammar of a human language. Phrase extraction module 210 may apply the one or more syntactic patterns 31A on text document 21A to extract one or more fragments or phrases 210A from text document 21A, where each fragment or phrase 210A comprises one or more words 210B.

According to some embodiments, phrase extraction module 210 may include a Parts-of-Speech (PoS) tagger, which is tool that it commonly used for Natural Language Processing (NLP) applications. The PoS tagger may be configured to analyze grammar of incoming sentences, and may annotate each word in the sentence with an appropriate (POS) tag, such as a noun, a verb, an adjective, and the like. According to some embodiments, phrase extraction module 210 may employ a PoS tagger, to annotate the words of document 21A. Phrase extraction module 210 may subsequently select sequences of words (e.g., phrases 210A), for which their respective PoS tags match one of our desired predefined syntactic patterns 31A. For example, for the predefined syntactic patterns 31A: ("verb→determiner→noun", "verb→determiner→adjective→noun"), the sequences "book a flight" and "book a quick flight" match, and will be extracted as phrases 210A. However, the sequence "flight booking" does not match, and will not be extracted as a phrase 210A. Phrase extraction module 210 may thus receive as input entire textual conversations, interactions and/or documents 21A, and may produce therefrom all the phrases or fragments 210A that matched one of the predefined syntactic patterns 31A.

For example, a first phrase 210A may include the text: "what I asked for", a second phrase 210A may include the text: "request a replacement", and a third phrase 210A may include the text: "something similar". These examples of phrases 210A are used herein to further elaborate aspects of the present invention.

As known in the art of Artificial Intelligence (AI)-based Natural Language Processing (NLP), a human language vocabulary is made of discrete elements, such as words. NLP systems may use neural network architectures to map each discrete element (e.g., each word) into a vector, commonly referred to as an "embedding vector" in a vector space commonly referred to as an "embedding vector space". Using this embedding vector space representation of words may enable NLP systems to have a continuous, distributed representation of human language vocabulary. The benefit of this continuous embedding vector representation is that NLP systems may map words that are similar in meaning to similar regions of the embedding vector space (e.g., to be represented by a similar embedding vector). For example, an embedding vector representation of the word "cat" may be similar (according to some predefined metric) to an embedding vector representation of the word "feline" than to an embedding vector representation of the word "piano".

As shown in FIG. 3A, module 200 may include a word embedding vector calculation module 220. In some embodiments, embedding vector calculation module 220 may be, or may include a word embedding neural network (NN), adapted to receive a word in a human language, and produce therefrom an embedding vector representation 220A of the received word. Embedding vector calculation module 220 may also be denoted herein as "module 220" or "embedding NN 220" for short.

According to some embodiments, module 200 may apply embedding NN 220 on one or more words 210B of extracted fragment 210A, to obtain one or more respective word embedding vectors 220A. As explained above, embedding vectors 220A may be adapted to encode a meaning of the one or more corresponding words 210B of a fragment or phrase 210A.

Pertaining to the example of the phrase 210A "something similar", embedding NN 220 may produce from phrase 210A a first embedding vector 220A representing the word 210B "something", and a second embedding vector 220A representing the word 210B "similar".

As known in the art of NLP, a Term Frequency-Inverse Document Frequency (TF-IDF) score is a numerical statistic that may indicate how important a word is to a specific document in a collection or corpus of documents. TF-IDF score may for example be used as a weighting factor in automated searches of textual information retrieval and text mining. The TF-IDF score value may increases proportionally to the number of times a word appears in the specific document, and is offset by the number of documents in the corpus 21 that contain the word. This offset may compensate for the fact that some words appear more frequently in general.

As shown in FIG. 3A, module 200 may include a word weight calculation module 230 that may receive at least one word 210B (e.g., the word "something") from an extracted phrase 210A (e.g., the phrase "something similar"), and may calculate a weight 230A that corresponds to the received word 210B.

According to some embodiments, weight calculation module 230 may be a calculator of TF-IDF score, and weight 230A may be a TF-IDF score value. For example, weight calculation module 230 may calculate a weight 230A of a specific word in relation to a specific document 21A as a TF-IDF function of (a) the number of appearances of the specific word 210B in the specific document 21A, and (b) the number of appearances of the specific word 210B in a corpus or a plurality 21 of documents 21A, pertaining to a specific tenant 20 or domain 20'.

Additionally, or alternatively word weight calculation module 230 may calculate weight 230A according to the following equation, Eq. 1:

$$\alpha[w_i] = \log\left(\frac{Nd}{M_{df}[w_i]}\right) \quad \text{Eq. 1}$$

where i is an index (e.g., 1, 2, 3) of phrase 210A (e.g., the phrase "something similar"); $w_i$ is a word 210B of index i in phrase 210A (e.g., "something", "similar"); Nd is the number of all documents in the plurality or corpus 21 of documents 21A; $M_{df}(w_i)$ is a mapping of word $w_i$ to the number of documents 21A containing word $w_i$; and $\alpha[w_i]$ is weight 230A.

As shown in the example Eq. 1, it may be appreciated by a person skilled in the art that word weight 230A (e.g., $\alpha[w_i]$) may be calculated, for example, as an Inverse Document Frequency function (e.g., IDF) of the TF-IDF function.

Figure 3B:
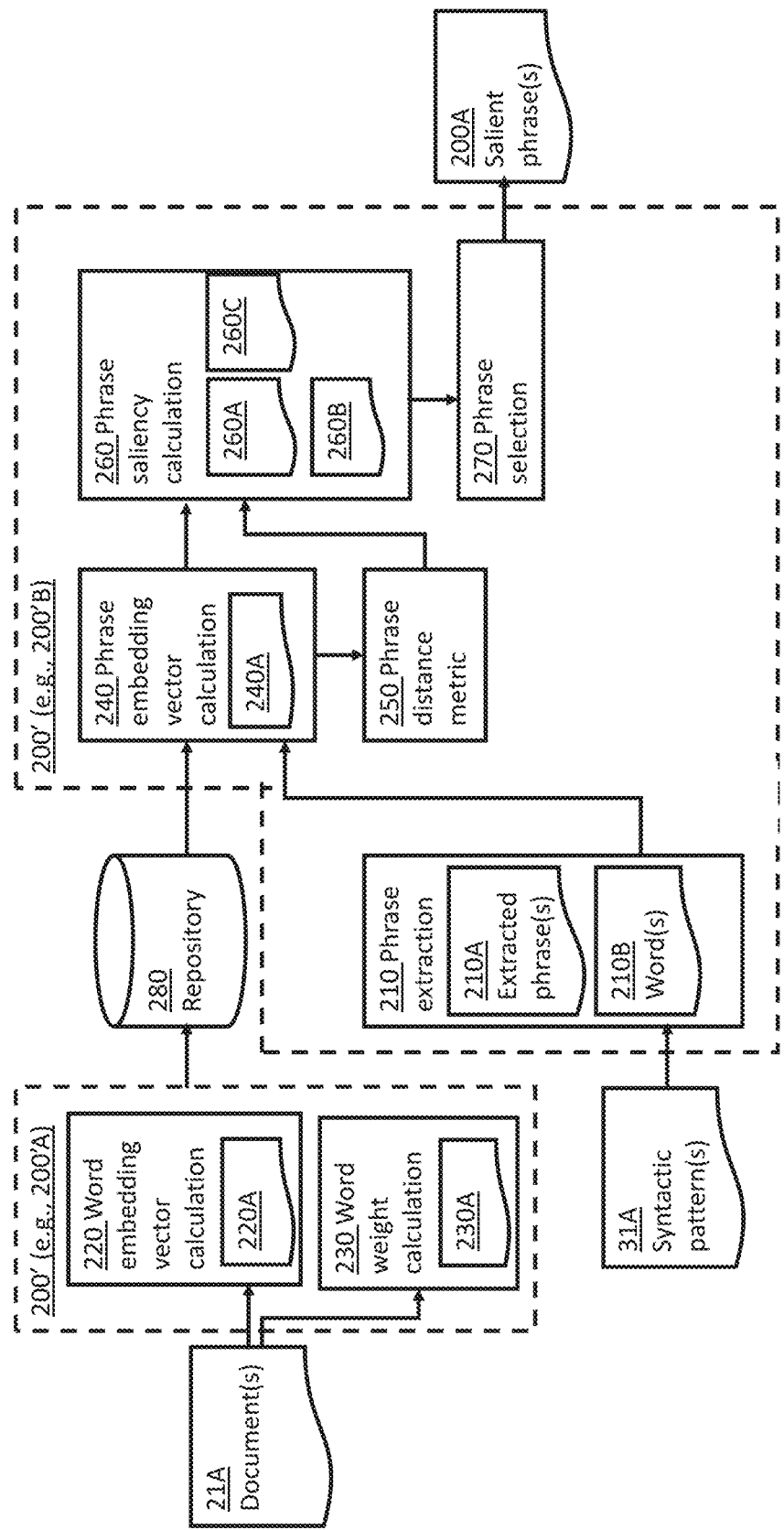
FIG. 3B is a block diagram, depicting a salience computation module, which may be included in a system for automatic topic detection in text, according to some embodiments of the invention.

Reference is now made to FIG. 3B, which is a block diagram, depicting an alternative implementation of a salience computation module 200, which may be included in system 100 for automatic topic detection in text, according to some embodiments of the invention. In FIG. 3B the implementation of salience computation module 200 is denoted 200', and may include two parts or modules, denoted 200'A and 200'B.

It may be appreciated that modules 200'A and 200'B may include modules (e.g., 210, 220, 230, 240, 250, 260 and 270) that are similar or identical to those of salience computation module 200 of FIG. 3A. It may be appreciated that modules 200'A and 200'B may be implemented on the same computing device (e.g., computing device 1 of FIG. 1) or distributed among a plurality of computing devices such as cloud computing devices.

As shown in FIG. 3A, module 200'A may receive a plurality of documents or interactions 21A, and may employ a word embedding vector calculation module 220 to calculate word embedding vectors 220A corresponding to words of the plurality of received documents 21A, as elaborated herein (e.g., in relation to FIG. 3A).

Additionally, or alternatively, module 200'A may employ a word weight calculation module 230 to calculate word weights 230A corresponding to words of the plurality of received documents 21A, as elaborated herein (e.g., in relation to FIG. 3A).

According to some embodiments, module 200'A may produce or calculate word embedding vectors 220A and/or word weights 230A in an offline process, and store word embedding vectors 220A and/or word weights 230A in a repository storage 280 (e.g., storage element 6 of FIG. 1). The term "offline" may be used in this context to indicate a preliminary process, by which word embedding vectors 220A and/or word weights 230A are calculated or prepared on words that are included in a general corpus 21 of documents, that may, or may not be related to analysis of specific documents of interest, as elaborated herein. According to some embodiments, storage repository 280 may be included in system 200'. Alternatively, and as depicted in FIG. 3B, system 200' may be associated with, or communicatively connected to storage repository 280, that may, for example, be implemented on a cloud storage service.

It may be appreciated that in a subsequent, "online" text analysis process, module 200' (e.g., 200'B) may retrieve the prepared word embedding vectors 220A and/or word weights 230A from repository storage 280. Module 200'B may then input the retrieved word embedding vectors 220A and/or word weights 230A to phrase embedding vector calculation module 240 to further analyze document 21A, as elaborated herein.

As shown in FIG. 3A, module 200 may include a phrase embedding vector calculation module 240 (or module 240 for short), adapted to calculate a weighted phrase embedding vector 240A, pertaining to one or more (e.g., each) extracted phrase 210A, based on the one or more word embedding vectors 220A.

According to some embodiments, module 240 may calculate weighted phrase embedding vector 240A as a weighted average of word embedding vectors 220A corresponding to words 210B of extracted phrases 210A. The weights used for this calculation may be each word's respective weight values 230A, such as TF-IDF score values.

For example, module 240 may calculate weighted phrase embedding vector 240A according to Algorithm 1, below:

---

Algorithm 1

$v_s := 0^d$
For each $w_i \in s$:
    $v_i := M_v[wi]$ $$a_i := \log\left(\frac{Nd}{M_{df}[w_i]}\right)$$

$v_s = v_s + \alpha_i v_i$ return $\frac{v_s}{m}$

--- where 's' is an extracted phrase or fragment 210A;
'$w_i$' is a word 210B of index i in phrase s;
$M_v$ is a mapping of word $w_i$ to embedded vector 220A, denoted here as $v_i$;
'$v_s$' is a weighted phrase embedding vector 240A, representing phrase s;
'm' is the number of words 210B in phrase s, and
'$\alpha[w_i]$' is weight 230A.

As shown in Algorithm 1, in the first line, weighted phrase embedding vector 240A may be initialized as a zero-vector.

According to some embodiments, the "for each" loop may traverse over the words $w_i$ (210B) of fragment s (210A), and weighted phrase embedding vector $v_s$ (240A) may be gradually built or aggregated with each word 210B. Additionally, or alternatively, module 200 may be implemented by one or more computing devices (e.g., computing device 1 of FIG. 1) having a plurality of processing cores. In such embodiments, module 200 may employ the plurality of processing cores, to implement parallel processing of algorithm 1, so as to perform parallel processing of words $w_i$ (210B) of fragment s (210A) to calculate weighted phrase embedding vector $v_s$ (240A).

As shown in algorithm 1, for each word of the phrase, word weight calculation module 230 may calculate a word weight value, based on frequency of appearance of the word in the first plurality of text documents. Additionally, for each word of the phrase, phrase embedding vector calculation module 240 may calculating the weighted phrase embedding vector $v_s$ (240A) as a weighted average of the relevant word embedding vectors $v_i$ 220A, based on the relevant word weight values $\alpha[w_i]$ 230A.

In the final line of Algorithm 1, weighted phrase embedding vector $v_s$ (240A) may be normalized according to m, the number of words in phrase s.

As shown in FIG. 3A, module 200 may include a phrase saliency calculation module 260, adapted to compute, for one or more (e.g., each) extracted phrase 210A, a phrase saliency score 260A, based on the weighted phrase embedding vector 240A, as elaborated herein.

According to some embodiments, module 200 may rank phrases 210A of a document 21A, based on how salient they are in relation to document 21A. This salience may indicate the extent to which specific phrases 210A align with primary subjects or topics of document 21A. Based on the assumption that salient phrases are similar in meaning to more phrases than non-salient phrases, embodiments of the invention may employ a graph algorithm, to rank phrase salience according to similarity with other phrases.

As shown in FIG. 3A, phrase saliency calculation module 260 may include, or maintain a phrase similarity graph 260B, which may be implemented as a data structure such as a table, a linked graph, and the like, and may represent similarity between different phrases 210A, as explained herein.

According to some embodiments, phrase saliency calculation module 260 may arrange the one or more phrases 210A as vertices or nodes in an undirected phrase similarity graph 260B, where each pair of vertices is connected by an edge. For one or more edges, phrase saliency calculation module 260 may assign a similarity weight value 260C that may represent semantic similarity between two phrases 210A of corresponding connected vertices in phrase similarity graph 260B. Phrase saliency calculation module 260 may subsequently, for each phrase, compute a phrase saliency score 260A, based on the similarity weight values 260C of the connected edges, as elaborated herein.

Figure 4:
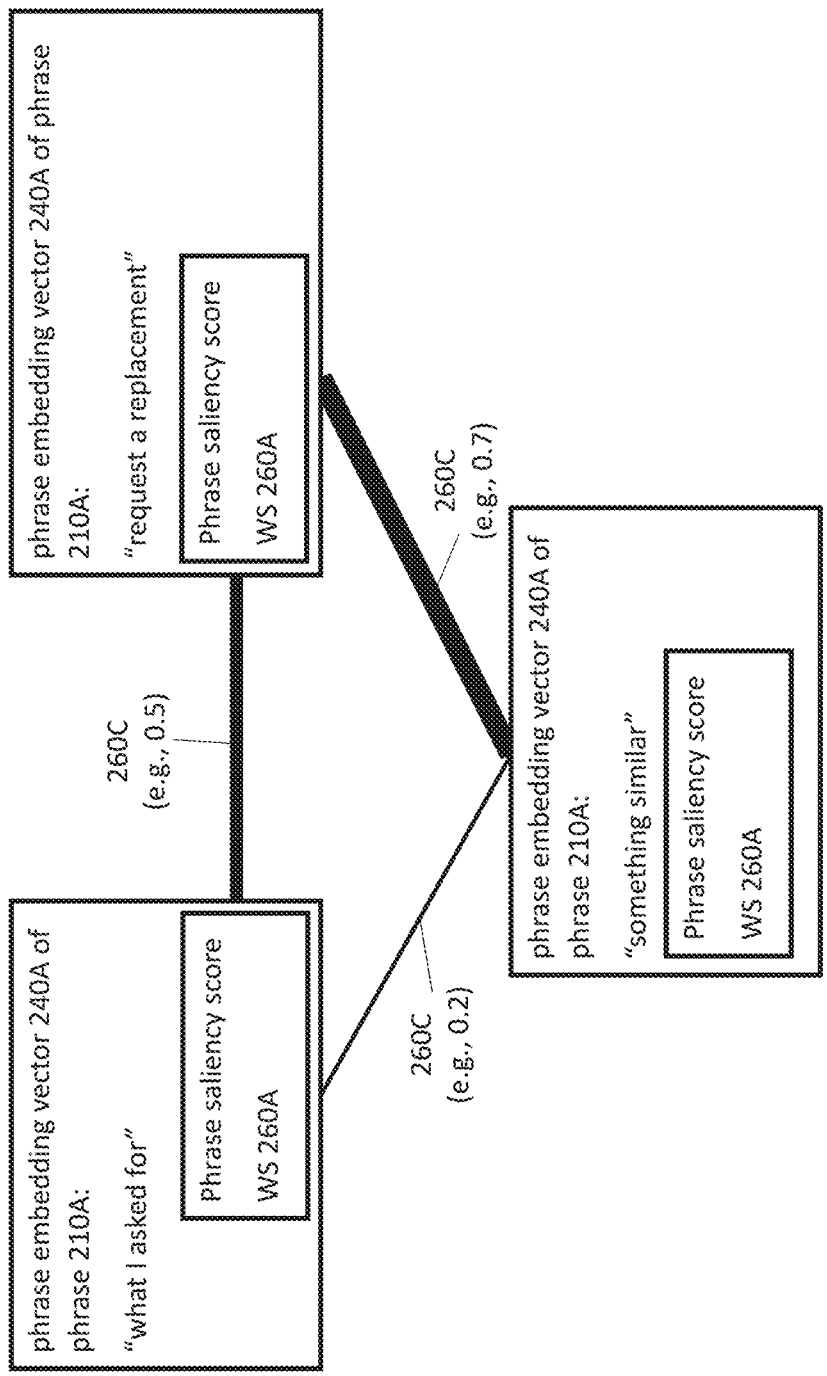
FIG. 4 is a schematic diagram, depicting a phrase similarity graph, which may be included in a system for automatic topic detection in text, according to some embodiments of the invention.

Reference is now also made to FIG. 4, which is a schematic diagram, depicting an example of a phrase similarity graph 260B, which may be included in a system for automatic topic detection in text, according to some embodiments of the invention.

As shown in FIG. 4, each phrase 210A may be represented by a node or vertex in phrase similarity graph 260B. The thickness of edges connecting between pairs of nodes may represent a similarity value or similarity weight 260C, indicating the semantic similarity (e.g., similarity in meaning) between the phrases 210A of the connected nodes.

For example, as shown in the example of FIG. 4, the two most similar phrases 210A are "request a replacement" and "something similar", and the two least similar phrases 210A are "what I asked for" and "something similar".

According to some embodiments, module 200 may include a phrase distance metric calculation module 250, that may calculate similarity 260C (e.g., cosine similarity) between phrases pertaining to pairs of nodes of phrase similarity graph 260B, based on the respective phrase embedding vectors 240A, and according to a predefined similarity metric, such as a cosine similarity metric. For example, phrase distance metric calculation module 250 may calculating similarity metric value such as a cosine similarity value 260C between word embedding vectors 220A of two phrases 210A, and phrase saliency calculation module 260 may attribute the cosine similarity value 260C as a similarity weight value to an edge that connects the vertices of the two respective phrases 210A in phrase similarity graph 260B.

Pertaining to the example of FIG. 4, phrase saliency calculation module 260 may receive a first phrase embedding vector 240A, corresponding to the "request a replacement" phrase 210, and a second phrase embedding vector 240A, corresponding to the "something similar" phrase 210. Phrase saliency calculation module 260 may collaborate with phrase distance metric calculation module 250, to calculate a distance metric (e.g., a cosine similarity function) on these first and second phrase embedding vectors 240A. Phrase saliency calculation module 260 may thus obtain a similarity value or similarity weight 260C, representing semantic similarity of the respective phrases.

The cosine similarity function may be defined according to equation Eq. 2 below:

$$w(vec_i, vec_j) = \frac{vec_i \cdot vec_j}{\|vec_i\|\|vec_j\|} \quad \text{Eq. 2}$$

where $vec_i$ and $vec_j$ are numerical vectors (e.g., phrase embedding vectors 240) pertaining to different phrases;

$w(vec_i, vec_j)$ represents a similarity weight 260C, that may be calculated for example as a result of a cosine similarity function, applied on vectors $v_i$ and $v_j$;

$vec_i \cdot vec_j$ represents vectoral (e.g., 'dot') multiplication of vectors $vec_i$ and $vec_j$.

According to some embodiments, phrase saliency calculation module 260 may calculate a phrase saliency score 260A of a specific phrase 210A as a function of the similarity weights 260C of the edges that are connected to the vertex representing that specific phrase.

For example, phrase saliency calculation module 260 may calculate a phrase saliency score 260A of a specific phrase 210A as a sum of the similarity weights 260C of the edges that are connected to the vertex representing that specific phrase. Pertaining to the example of FIG. 4, the similarity weights 260C of edges connected to the "request a replacement" phrase 210 may be 0.5 and 0.7, and therefore phrase saliency calculation module 260 may assign a phrase saliency score 260A of 0.5+0.7=1.2 to the "request a replacement" phrase 210. In a similar manner, the similarity weights 260C of edges connected to the "what I asked for" phrase 210 may be 5 and 2, and therefore phrase saliency calculation module 260 may assign a phrase saliency score 260A of 0.5+0.2=0.7 to the "what I asked for" phrase 210.

Additionally, or alternatively, phrase saliency calculation module 260 may calculate a phrase saliency score 260A one or more specific phrase 210A in an iterative process, according to equation Eq. 3 below:

$$WS(v_i) = \sum_{j=0; j \neq i}^{|V|} \frac{w(v_i, v_j)}{\sum_{k=0; k \neq j}^{|V|} w(v_j, v_k)} WS(v_j) \quad \text{Eq. 3}$$

Where:

$v_i$ and $v_j$ are phrase embedding vectors 240A, of phrases 210A (e.g., depicted as nodes of FIG. 4);

$w(v_i, v_j)$ is a similarity weight 260C of an edge connecting nodes $v_i$ and $v_j$ (e.g., depicted as edges of FIG. 4);

V is a vector space that includes all phrase embedding vectors 240A, including $v_i$ and $v_j$;

|V| is a size of vector space V (e.g., number of vectors $v_i$); and

WS may represent a phrase saliency score 260A of a specific node. In other words, WS may be a function, mapping phrase embedding vector $v_i$ (240A) to a phrase saliency score 260A.

As shown in Eq. 3, the calculation of a specific phrase saliency score WS (260A), pertaining to a specific phrase (represented by phrase embedding vector $v_i$) may depend on calculation of one or more other phrase saliency scores WS (260A).

For example, the iterative process may start by initiating the phrase saliency score WS (260A) of each node to the value of '1'. In a first iteration, the value of at least one phrase saliency score WS (260A) may be updated to be a sum of the edges (e.g., similarity weight 260C) that connect to the respective node. Each subsequent iteration of the iterative process may include: (a) computing a phrase saliency score WS 260A of a first fragment or phrase 210A, according to Eq. 3 (e.g., based on the similarity weights 260C of edges connected to the respective vertex, and further based on a phrase saliency score 260A of at least one second fragment 210A); and (b) updating the phrase saliency score 260A of the at least one second fragment 210A, based on the computed phrase saliency score 260A of the first fragment 210A.

Referring back to the example of FIG. 4, it may be seen that the phrase 210A "request a replacement" is the most salient phrase, as it more centric, having significant similarity to the two other phrases or fragments, whereas the other phrases or fragments 210A only have significant similarity to one other phrase.

According to some embodiments, phrase saliency calculation module 260 may continue the iterative process of phrase saliency score 260A calculation as elaborated herein (e.g., in relation to Eq. 3) until a convergence condition is met.

For example, convergence of the iterative phrase saliency score calculation can be defined as the point where a sum of changes in the values mapped by WS, between a first iteration and a second, subsequent iteration is below a predefined threshold ε, as elaborated in equation Eq. 4, below:

$$\text{convergence}(WS) = |\Sigma_{i=0}^{|V|} |WS_{iteration_n}(v_i)| - \Sigma_{i=0}^{|V|} |WS_{iteration_{n-1}}(v_i)|| < \varepsilon \quad \text{Eq. 4}$$

As shown in FIG. 3, module 200 may include a phrase selection module 270, adapted to select one or more phrases 210A as salient phrases 200A according to their respective phrase saliency scores 260A, and based on a predefined selection criterion. In other words, phrase selection module 270 may filter-out phrases 210A that correspond to lesser phrase saliency scores 260A, based on a predefined filtering criterion.

For example, phrase selection module 270 may select a predefined number, a predefined subset, or a predefined percentage of phrases 210A, that correspond to top phrase saliency scores, as salient phrases 200A. In another example, phrase selection module 270 may select phrases for whom the respective phrase saliency scores 260A surpasses a predefined threshold as salient phrases 200A. Phrase selection module 270 may discard phrases 210A that do not comply with the relevant selection criterion (e.g., phrases 210A that correspond to least phrase saliency scores 260A).

Figure 5:
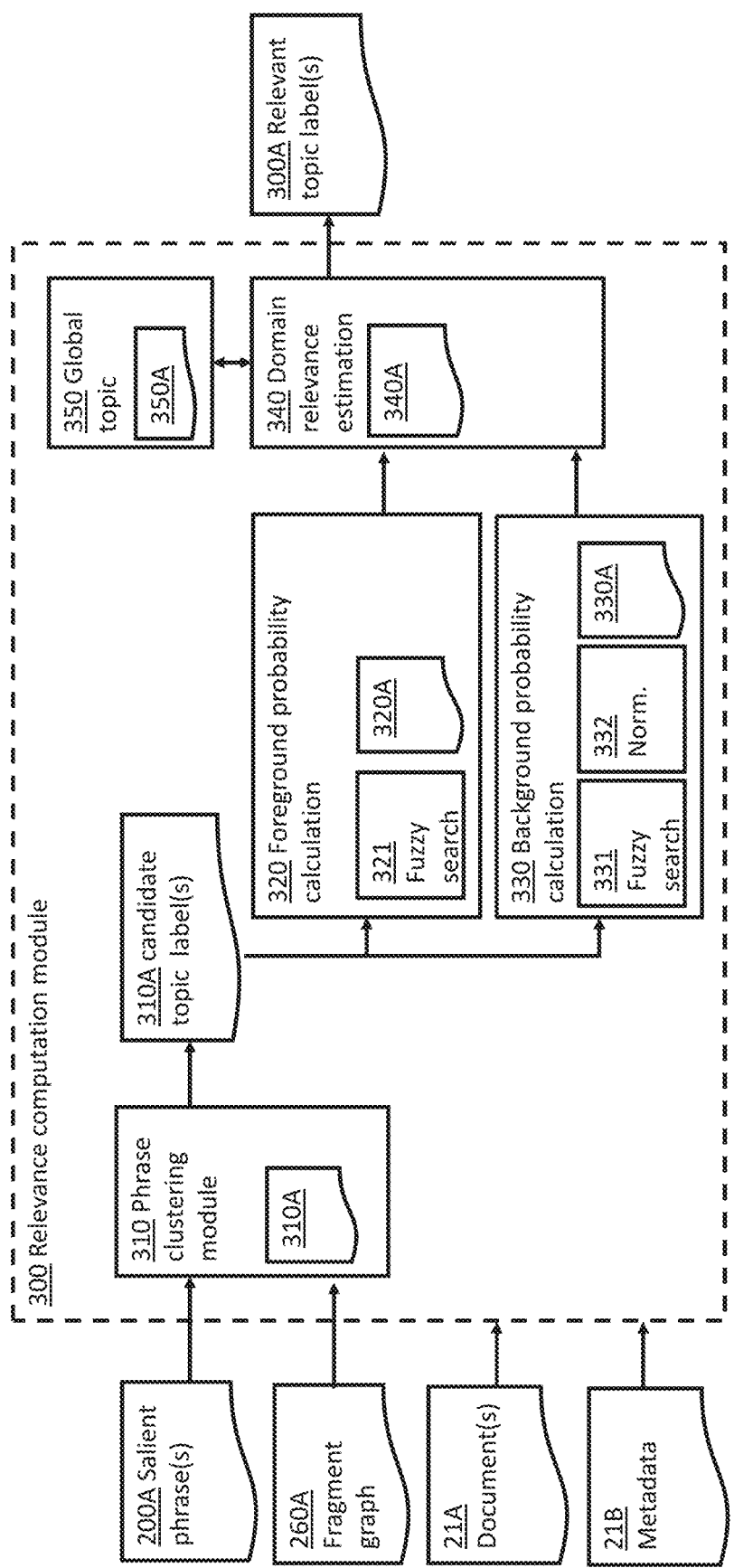
FIG. 5 is a block diagram, depicting a relevance computation module, which may be included in a system for automatic topic detection in text, according to some embodiments of the invention.

Reference is now made to FIG. 5, which is a block diagram, depicting a relevance computation module 300 (or module 300, for short), which may be included in a system for automatic topic detection in text, according to some embodiments of the invention.

As shown in FIG. 5, module 300 may include a phrase clustering module 310, adapted to cluster a plurality of salient phrases 200A, from a plurality of documents 21A and/or a plurality of corpuses 21 into groups or clusters, representing topic labels 310A, according to a predefined similarity metric.

As elaborated herein (e.g., in relation to FIG. 3A), phrase saliency calculation module 260 may obtain a plurality of phrases 210A and a respective plurality of phrase saliency scores, and select a subset of the plurality of phrases 210A, corresponding to the top phrase saliency scores, and denoted herein salient phrases 210A.

According to some embodiments, clustering module 310 may be adapted to cluster the subset of phrases (salient phrases 210A) into clusters 310A, based on the calculated cosine similarity values 260C, wherein each cluster 310A represents a unique topic label, as elaborated herein.

According to some embodiments, clustering module 310 may produce one or more topic labels (denoted candidate topic labels 310A in FIG. 5). These topic labels 310A may represent one or more respective topics of at least one text document 21A. Clustering module 310 may produce the one or more topic labels 310A based on the selected salient phrases 200A (which were in turn selected based on the computed phrase saliency scores 260, as explained above).

For example, one or more first documents 21A may yield a first set of salient phrases 200A, including a "technical assistance" salient phrase 200A, and one or more second documents 21A may yield a second set of salient phrases 200A, including a "technical help" salient phrase 200A. Phrase clustering module 310 may calculate a cosine similarity metric value 260C as elaborated herein (e.g., in relation to Eq. 2) among pairs of salient phrases 200A of the first set and second set of salient phrases 200A. Phrase clustering module 310 may use the calculated similarity metric values (e.g., the cosine similarity values) to cluster salient phrases 200A into groups or clusters, where each cluster may represent a topic label. In this example, the cosine similarity metric value 260C may be expected to be high for the "technical assistance" salient phrase 200A and the "technical help" salient phrase 200A, as their meanings are near-identical. Therefore, phrase clustering module 310 may be expected to join these salient phrases 200A into a single cluster.

Phrase clustering module 310 may attribute, or produce an appropriate topic label 310A for each cluster, based on the ubiquity of salient phrases 200A in that cluster. Pertaining to the same example, if the "technical assistance" salient phrase 200A appears in corpus 21 more times than the "technical help" salient phrase 200A, then phrase clustering module 310 may assign to the common cluster a topic label 310A that is identical to the more ubiquitous, "technical assistance" salient phrase 200A.

As known in the art, cloud-based services that provides contact center solutions may have various tenants that may be grouped into domains 20' (e.g., Business domains 20') at some selected granularity level. For example, a first domain 20' may include tenants 20 that are insurance companies, a second domain 20' may include tenants 20 that are telecommunication companies, and a third domain 20' may include tenants 20 that are car-rental agencies. Embodiments of the invention may differentiate between phrases that may relate to specific domains 20', and phrases that are general: As elaborated herein, phrase clustering module 310 may aggregate or cluster salient phrases 200A into a plurality of candidate topic labels 310A, which may represent topics that were mentioned repeatedly in various interactions or documents 21A. As elaborated herein, relevance computing module 300 may filter out topic labels from the plurality of candidate topic labels 310A, that are either: (a) not specific enough, or relevant enough to a specific tenant 20, or (b) do not correlate with interesting global topics or subjects (e.g., topics pertaining to multiple tenants 20).

Currently available systems for topic detection may estimate relevance, or "informativeness" of text in a single analyzed document by: (a) calculating an n-gram language model for a background corpus; (b) calculating an n-gram language model for a foreground corpus; and (c) favoring n-grams with significantly higher probability on the foreground corpus, in comparison to the background corpus, as such that contribute information to the analyzed document. The term "foreground" may be used in this context to indicate a corpus of documents that relates to a specific tenant 20 or domain 20' of interest. In a complementary manner, the term "background" may be used in this context to indicate a corpus of documents that may relate to global, or general tenants 20 or domains 20'.

The n-gram models may be comprised of a plurality of probability values, representing a probability of appearance of specific sequences of words. These probability values may be calculated, for example, based on the following equation, Eq. 5:

$$P(s) = \Pi_{i=0}^{n} p(w_i | w_0, \ldots, w_{i-1}) \quad \text{Eq. 5}$$

where s is a sequence of n words;
$w_i$ are words in sequence s, indexed by i;
P(s) is the probability of appearance of the sequence of n words; and
$p(w_i | w_0, \ldots, w_{i-1})$ is the conditional probability of word $w_i$, given a preceding sequence of (i-1) words.

The probability for word $W_n$ given a preceding sequence of N−1 words can be calculated by counting the number of occurrences (denoted by c) of subsequences in the corpus, as shown in equation Eq. 6, below:

$$P(w_n | w_{n-N+1}, \ldots, w_{n-1}) = \frac{C(w_{n-N+1}, \ldots, w_n)}{C(w_{n-N+1}, \ldots, w_{n-1})} \quad \text{Eq. 6}$$

According to some embodiments, a corpus 21 of the present invention may include a diverse collection of many documents or interactions 21A, each with its own writer, speaker, style, and jargon. In addition, embodiments of the invention may aim to determine relevance or informativeness of specific topics in multiple documents, and in relation to specific tenants and/or business domains 20'. Embodiments of the invention may include a plurality of improvements over currently available systems for topic detection, to accommodate these aims, as elaborated herein.

A first such improvement may include the usage of phrases, or fragments, rather than n-grams as building blocks for topic detection, as elaborated herein (e.g., in relation to FIG. 2, FIG. 3A). This approach has been shown to significantly decrease the number of required computations in relation to currently available systems, by avoiding the need to calculate n-gram models that include large numbers of sequence probabilities (e.g., as elaborated in Eq. 5, Eq. 6).

Another improvement of the present invention over currently available systems for topic detection may include extraction of salient phrases 200A, so as to improve the quality of phrases in document 21A that are input to relevance computation module 300, as elaborated herein (e.g., in relation to FIG. 2).

Another improvement of the present invention over currently available systems for topic detection may include using a metric of document frequency (DC), e.g., the number of interactions or documents 21A that contain the word sequence, instead of the number of occurrences of a sequence in the corpus. Thus, embodiments of the invention may avoid the need to calculate the probability of subsequences as elaborated in Eq. 5 and Eq. 6. In other words, embodiments of the invention may use equation Eq. 7 below, which is a reduced version of Eq. 5, and may thus simplify calculation of topic relevance without compromising the calculation's outcome as demonstrated herein (e.g., in relation to FIG. 6, below). It may be appreciated that such reduction of computation by embodiments of the invention may facilitate a practical application, and improve the performance of at least one computing device (e.g., computing device 1 of FIG. 1) in the process of natural language processing.

$$P(s; A) = \frac{DC(s)}{|A|} \qquad \text{Eq. 7}$$

where s is a sequence of words (e.g., a candidate topic label 310A);
A is a corpus 21 of interactions;
|A| is the number of interactions in the corpus;
DC(s) is the number of interactions or documents 21A in corpus A, that include sequence s; and
P(s) is the probability of appearance of s in corpus A.

Another improvement of the present invention over currently available technology of topic detection may include normalizing the effect of tenants in the background corpus, such that each tenant and each domain 20' will have a similar effect over the selected topics, as elaborated herein.

Another improvement of the present invention over currently available systems for topic detection may include employing a fuzzy search of topics within the relevant corpus of documents, rather than a strict n-gram search, as elaborated herein.

According to some embodiments, relevance computation module 300 may calculate relevance of candidate topic label 310A in relation to a specific plurality, or corpus of documents. For example, relevance computation module 300 may receive a first plurality or corpus 21 of documents 21A pertaining to a first business domain 20' (e.g., car rental agencies), and a second plurality or corpus 21 of documents 21A pertaining to a at least one second business domain 20' (e.g., hospitals).

Relevance computation module 300 may, for one or more (e.g., each) candidate topic labels 310A, calculate a foreground probability value 320A, representing probability of the topic label to represent a topic comprised in the first plurality or corpus 21. Additionally, relevance computation module 300 may, for one or more (e.g., each) candidate topic labels 310A, calculate a background probability value, representing probability of the topic label to represent a topic comprised in at least one of the first corpus 21 and second corpus (e.g., in either one of the domains). Relevance computation module 300 may subsequently calculate a relevance score 340A, representing pertinence of the candidate topic label to the first business domain, based on the foreground probability value and the background probability value, as elaborated herein.

As shown in FIG. 5, relevance computation module 300 may include a Foreground probability calculation 320 (or module 320, for short).

According to some embodiments, module 320 may receive (e.g., via input device 7 of FIG. 1) metadata 21B pertaining to the one or more documents 21A. Metadata 21B may include, for example, annotation of tenants 20 and/or domains 20' to which one or more (e.g., each) documents 21A pertains. For example, metadata 21B may be, or may include a data structure (e.g., a table), that may associate between specific documents 21A and respective identifications of tenants 20 and/or domains 20'. Additionally, module 320 may also receive one or more candidate topic labels 310A, pertaining to specific documents 21A (and via meta-data 21B—to specific tenants 20 and/or domains 20') from phrase clustering module 310.

According to some embodiments, module 320 may employ a fuzzy search module 321, adapted to perform a fuzzy word search of candidate topic labels 310A in documents 21A, as known in the art. The term "fuzzy" may be used in this context to refer to a search that may not be limited to strictly finding exact appearances of word sequences in a document (e.g., as done in the case of n-gram models), but may also aim to find word sequences that are lexically similar, allowing a configurable amount of edit operations (insert, delete, replace) between the desired sequence and found sequences. For example, a fuzzy search may ignore up to 2 "insert" words, matching the phrase "book me two tickets" with the desired sequence "book tickets". Additionally, a fuzzy search may ignore functional words such as "the", "is" and the like, and may apply lemmatizing to the words, thus retrieving variations like "book ticket" and "booking tickets".

According to some embodiments, module 320 may use Eq. 7 to calculate the probability of one or more candidate topic labels 310A to appear in a document 21A of a foreground corpus of documents pertaining to a specific tenant 20 of interest, based on the fuzzy word search. Additionally, module 320 may calculate the probability of the one or more candidate topic labels 310A to appear in a document 21A of a foreground corpus.

According to some embodiments, module 320 may retrieve data pertaining to multiple tenants 20 of the same domain 20', according to equation Eq. 8A, below. Module 320 may use the fuzzy word search results of module 321 to calculate the probability of candidate topic labels 310A to appear in a document 21A of a corpus of documents 21 pertaining to a foreground domain 20' (e.g., a specific domain 20' of interest). In this calculation, the different amounts of documents 21 between tenants and/or time periods, may be normalized accordingly:

$$P(s; FG) = \frac{\sum_{t \in FG} \frac{DC_t(s)}{|t|}}{Num\_t\_in\_FG} \qquad \text{Eq. 8A}$$

where:
P(s; FG) is the probability 320A of appearance of a topic label s (310A) in a corpus pertaining to a foreground (FG) domaing 20' of interest;
t is a specific tenant 20 pertaining to the domain 20' of interest (t∈FG);
|t| represents the number of documents or interactions 21A pertaining to tenant t 21;
DCt(s) is the number of interactions or documents 21A pertaining to tenant t 21 that include topic label s (310A); and
Num_t_in_FG is the number of tenants in the foreground (FG) domain 20' of interest.

According to some embodiments, and as elaborated by Eq. 8A, module 320 may calculate foreground probability value P(s; FG) 320A, of a specific candidate topic label 310A by: (a) applying a fuzzy search 321 of the topic label, on a corpus 21 pertaining to a foreground (FG) domain 20' of interest; (b) counting a number DCt(s) of documents 21A of the corpus 21 of documents 21A that include the relevant topic; and (c) calculating the foreground probability value P(s; FG) 320A as a ratio between DCt(s) and |t|, e.g., the number of documents pertaining to tenant t 21. Additionally, or alternatively, foreground probability value P(s; FG) 320A may be calculated as a ratio between DCt(s) and the number of documents in the foreground (FG) domain 20' of interest. P(s; FG) 320A may be further normalized by Num_t_in_FG, e.g., the number of tenants in the foreground domain 20' of interest.

According to some embodiments, relevance computation module 300 may include a background probability calculation module 330 (or module 330 for short). According to some embodiments, module 330 may use a fuzzy word search module to perform a fuzzy word search on documents 21A of a corpus of documents 21 that pertain to a background domain 20' (e.g., a general domain 20', that is not limited to include only a tenant 20 or domain 20' of interest).

Module 330 may use the fuzzy word search results of module 331, to calculate the probability of candidate topic labels 310A to appear in a document 21A of a corpus of documents 21 pertaining to the background domain 20', according to equation Eq. 8B below. It may be appreciated that this calculation may enable module 300 to assess the probability of a candidate topic label 310A to be in general usage, across various domains 20'.

$$P(s; BG) = \frac{\sum_{t \in BG} \frac{DC_t(s)}{|t|}}{Num\_t\_in\_BG} \quad \text{Eq. 8B}$$

where:
P(s; BG) is the probability 330A of appearance of a topic label s (310A) in a corpus pertaining to a background (BG) domain 20' (e.g., a domain 20 that is not limited to include only a tenant 20 or domain 20' of interest);
t is a specific tenant 20 pertaining to the background domain 20' (t∈ BG);
|t| represents the number of documents or interactions 21A pertaining to tenant t 21;
DCt (s) is the number of interactions or documents 21A pertaining to tenant t 21 that include topic label s (310A); and
Num_t_in_BG is the number of tenants in the background (BG) domain 20'.

According to some embodiments, module 320 may calculate background probability value P(s; BG) 330A, of a specific candidate topic label 310A by: (a) applying a fuzzy search 331 of the topic label, on a corpus 21 pertaining to a background (BG) domain 20'; (b) counting a number DCt(s) of documents 21A of the corpus 21 of documents 21A that include the relevant topic; and (c) calculating the background probability value P(s; BG) 330A as a ratio between DCt(s) and e.g., the number of documents pertaining to tenant t 21. Additionally, or alternatively, background probability value P(s; BG) 330A may be calculated as a ratio between DCt(s) and the number of documents in the BG domain 20'. P(s; BG) may be further normalized by Num_t_in_BG, e.g., the number of tenants in the background domain 20'.

According to some embodiments, module 300 may include a global topic module 350, adapted to handle a group or list of topic labels, that are predefined as globally important topics (denoted 350A) separately from candidate topic labels 310A. For example, globally important topic labels 350A may refer to a list of topics that may be of interest to most or all tenants or contact centers using system 100. The globally important topic labels list 350A may, for example be received from a user via input device 7 of FIG. 1, may include, for example, topics like "supervisor", "lawsuit", and the like, and may be adjusted (e.g., by the user) through time.

According to some embodiments, module 300 may include a domain relevance estimation module 340, adapted to estimate a relevance or informativeness of one or more topic labels (e.g., 310A, 350A) to a tenant or domain of interest, and produce therefrom one or more one or more relevant topic labels 300A.

As elaborated above, e.g., in relation to equation Eq. 8A, module 320 may calculate the probability P(s; FG) 320A of a candidate topic label s 310A to appear in a document 21A pertaining to a foreground corpus 21. Additionally, as elaborated above, e.g., in relation to equation Eq. 8B, module 330 may calculate the probability P(s; BG) 330A of a candidate topic label 310A to appear in a document 21A pertaining to a background corpus 21.

According to some embodiments, domain relevance estimation module 340 may calculate, for one or more (e.g., each) candidate topic label s 310A, a relevance score 340A as a ubiquity ratio of the two calculated probabilities. For example, relevance score 340A may be calculated according to equation Eq. 9, below:

Relevance score 340A=P(s;FG)320A/P(s;BG)330A   Eq. 9

The term ubiquity ratio may be used herein in a sense that it may represent a ratio between (a) the probability of appearance, or ubiquity of appearance of a candidate topic label 310A in a corpus 21 pertaining to a foreground domain 20', and (b) the probability of appearance, or ubiquity of appearance of a candidate topic label 310A in a corpus 21 pertaining to a background domain 20'.

According to some embodiments, domain relevance estimation module 340 may compare relevance score 340A to a predefined threshold value. If relevance score 340A surpasses the predefined threshold, then the relevant candidate topic label 310A may be regarded as being relevant or important, in the context of the foreground domain. Candidate topic label 310A may subsequently be included in the output relevant topic labels 300A.

Alternatively, if relevance score 340A does not surpass the predefined threshold, then the relevant candidate topic label 310A may be flagged as a candidate for removal. According to some embodiments, in this condition, global topic handling module 350 may determine the closeness of the flagged candidate topic label 310A to one or more global important topic labels 350A, using phrase distance metric (e.g., cosine similarity) calculation module 250, as elaborated herein (e.g., in relation to FIG. 3A). For each of the flagged labels, if calculated distance to the global important topics is beyond a predefined threshold (e.g., the cosine similarity 260C is below a predefined threshold) then the relevant candidate topic label 310A may be discarded as irrelevant, or as having low importance in the context of the foreground domain 20'.

Figure 6:
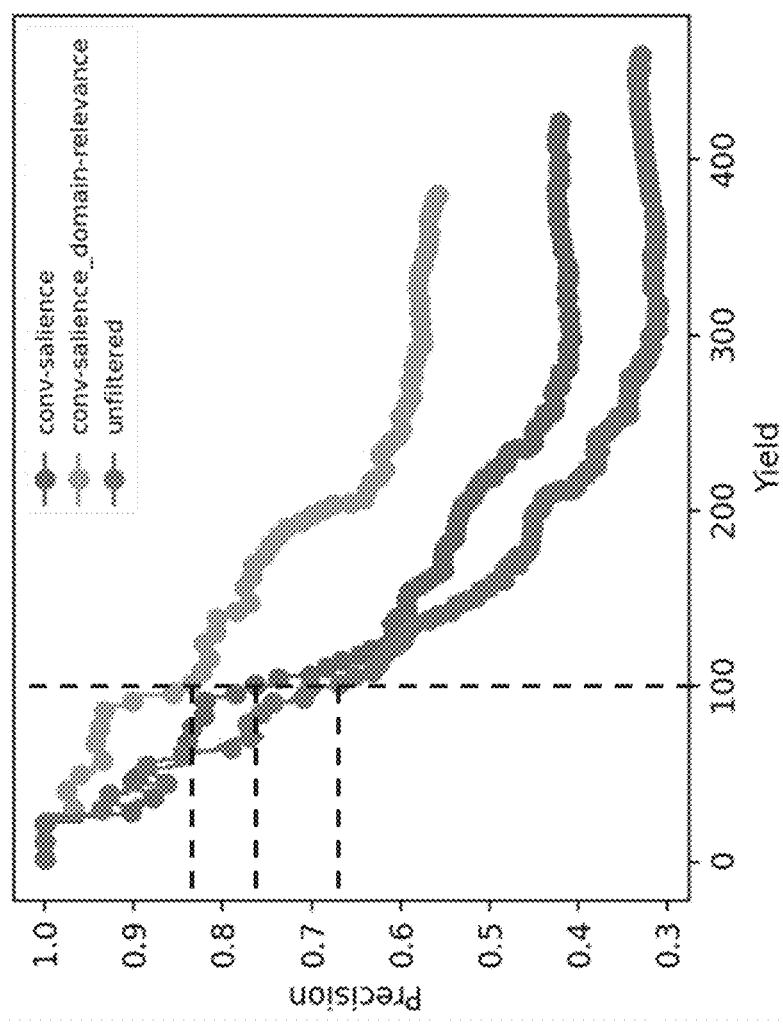
FIG. 6 is a graph depicting an example of improvement of relevant topic identification by embodiments of the present invention.

Reference is now made to FIG. 6, which is a graph depicting an example of improvement of relevant topic identification by embodiments of the present invention. As shown in the example of FIG. 6. The orange plot represents performance of a topic detection system according to embodiments of the invention that may (a) employ filtering of phrases by module 200, to obtain salient phrases 200A as elaborated herein (e.g., in relation to FIG. 3A), and (b) employ a domain relevance estimation module 340, to estimate a relevance or informativeness of one or more candidate topic labels 310A to a tenant 20 or domain 20' of interest. The blue plot represents performance of a topic detection system according to embodiments of the invention that may employ filtering of phrases by module 200 but does not employ a domain relevance estimation module 340. The green plot represents performance of a topic detection system according to embodiments of the invention that does not employ filtering of phrases by module 200 and does not employ a domain relevance estimation module 340.

A "yield", as portrayed in example FIG. 6 may represent a number of relevant topic labels (e.g., element 300A of FIG. 5), that may be obtained by embodiments of the invention. A "precision", as portrayed in example FIG. 6 may represent a portion of true-positive topic labels, from the overall number of yielded topic labels 300A.

As shown by the broken line in the example FIG. 6, the three plots present a level of precision for a yield of 100 relevant topic labels.

It may be appreciated (by comparing the blue and green plots) that filtering of phrases by module 200, to identify salient phrases 200A as a preliminary step before calculating topic relevance may improve the quality (e.g., precision) of identified topic labels 300A. In other words, embodiments of the invention may include an improvement over currently available systems for topic identification by identifying salient phrases 200A, and using salient phrases 200A (e.g., instead of n-grams and/or general phrases) for topic detection.

Additionally, it may be appreciated (by comparing the blue and orange plots) that filtering candidate topic labels according to their relevance in context of specific domains (e.g., according to relevance score 340A) may improve the quality (e.g., precision) of identified topic labels 300A. In other words, embodiments of the invention may include an improvement over currently available systems for topic identification employing tenant 20-specific and/or domain 20'-specific filtering of candidate topic labels, as elaborated herein (e.g., in relation to FIG. 5).

Figure 7:
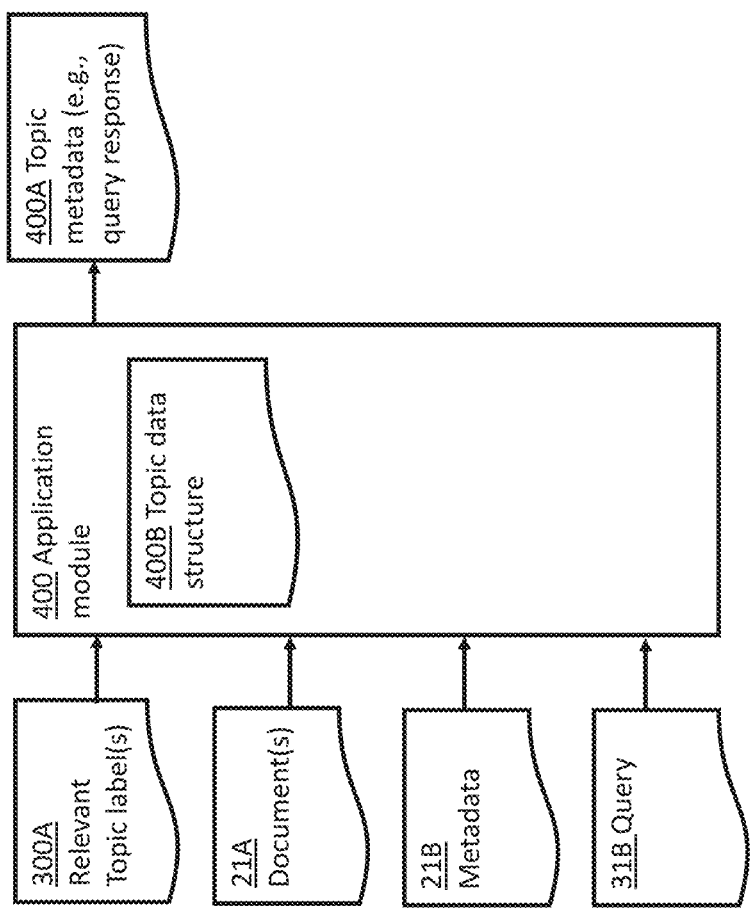
FIG. 7 is a block diagram, depicting an example of an application module, which may be included in, or associated with a system for automatic topic detection in text, according to some embodiments of the invention.

Reference is now made to FIG. 7, which is a block diagram, depicting an example of an application module 400, which may be included in, or associated with a system (e.g., system 100 of FIG. 2) for automatic topic detection in text, according to some embodiments of the invention. According to some embodiments, application module 400 may be implemented on the same computing device (e.g., element 1 of FIG. 1) as system 100 of FIG. 2. Additionally, or alternatively, application module 400 may be implemented on a computing device separate from system 100, and may be communicatively connected to system 100 via a computer network (e.g., the Internet).

According to some embodiments, application module 400 may receive, e.g., from input device 7 of FIG. 1, one or more documents 21A, and corresponding metadata 21B. Additionally, application module 400 may receive (e.g., from system 100) one or more relevant topic labels 300A, pertaining to documents 21A and metadata 21B, as elaborated herein. Application module 400 may store (e.g., on storage device 6 of FIG. 1) the received data as a topic data structure 400B (e.g., a list, a table in a database, and the like).

According to some embodiments, application module 400 may receive, e.g., via a user interface (UI) such as input device 7 of FIG. 1, at least one query 31B. Query 31B may, for example relate to a topic that may, or may not be present in the one or more received documents 21A.

According to some embodiments, application module 400 may subsequently produce a response 400A to the query, based on the one or more relevant topic labels 300A.

In other words, as elaborated herein, (e.g., in relation to FIG. 5), module 300 may select one or more candidate topic labels 310A as relevant, based on relevance score 340A, to produce relevant topic labels 300A. Application module 400 may thus produce a response to the query, that may relate to one or more topics included in documents or interactions 21A, based on the one or more candidate topic labels 310A and corresponding relevance scores 340A.

For example, query 31B may inquire whether a specific topic is included in a specific document 21A, and query response 400A may include an answer (e.g., yes/no) to that inquiry 31B. In another example, query 31B may inquire which of documents 21A include one or more topics from a list of topics, and query response 400A may include an answer (e.g., a list of corresponding documents) to inquiry 31B.

Figure 8:
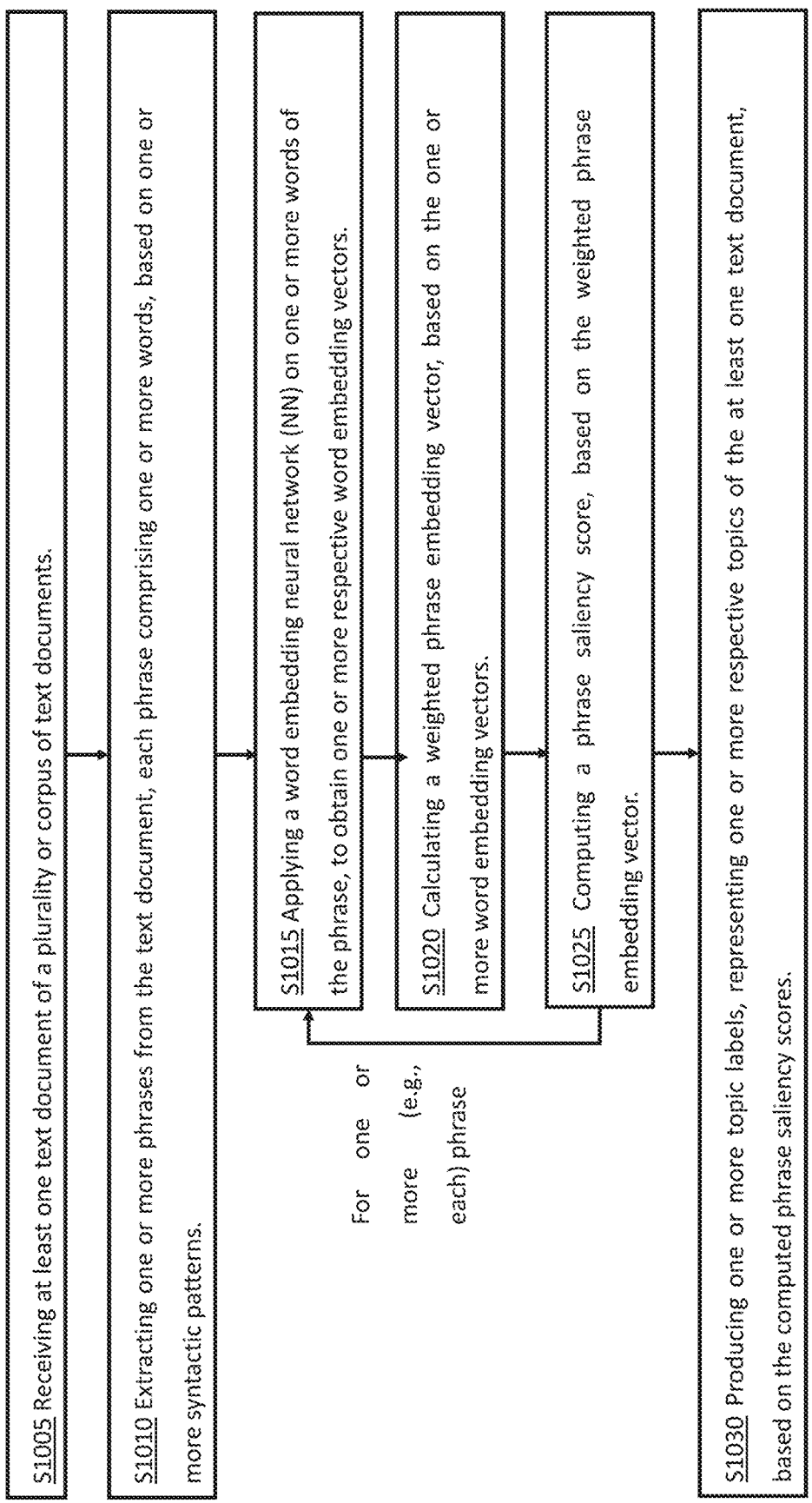
FIG. 8 is a flow diagram, depicting a method of automatic topic detection in text, according to some embodiments of the invention.

Reference is now made to FIG. 8, which is a flow diagram, depicting a method of automatic topic detection in text by at least one processor (e.g., processor 2 of FIG. 1), according to some embodiments of the invention.

As shown in step S1005, the at least one processor 2 may receive at least one text document (e.g., document 21A of FIG. 2) of a plurality or corpus (e.g., corpus 21 of FIG. 2) of text documents.

As shown in step S1010, the at least one processor 2 may collaborate with a phrase extraction module (e.g., phrase extraction module 210 of FIG. 3A) to extract one or more phrases (e.g., phrases 210A of FIG. 3A) from the at least one text document. As elaborated herein (e.g., in relation to FIG. 3A), phrase extraction module 210 may extract phrases 210A based on one or more syntactic patterns 31A, and each phrase 210A may include one or more words 210B.

As shown in step S1015, for each phrase 210A the at least one processor 2 may applying a word embedding NN (e.g., word embedding vector calculation module 220 of FIG. 3A) on one or more words 210B of the one or more phrases 210A, to obtain one or more respective word embedding vectors (e.g., element 220A of FIG. 3A).

As shown in step S1020 and S1025, for each phrase 210A the at least one processor 2 may subsequently calculate a weighted phrase embedding vector (e.g., element 240A of FIG. 3A), based on the one or more word embedding vectors 220A and computing a phrase saliency score 260A, based on the weighted phrase embedding vector 240A, as elaborated herein (e.g., in relation to FIG. 3A).

As shown in step S1030, the at least one processor 2 may produce one or more topic labels (e.g., relevant topic label(s) 300A of FIG. 5), representing one or more respective topics of the at least one first text document, based on the computed phrase saliency scores 260A, as elaborated herein (e.g., in relation to FIG. 3A and FIG. 5).

As elaborated herein, embodiments of the invention may include a practical application of performing automated text analysis, including for example determination or identification of relevant topics in documents and/or textual interactions. For example, embodiments of the invention may be configured to receive (e.g., via a UI) at least one query (e.g., query 31B of FIG. 7), in relation to a topic present a plurality of documents and produce a response to the query, based on the one or more relevant topic labels 300A, as elaborated herein (e.g., in relation to FIG. 7).

Embodiments of the invention include a plurality of improvements in technology over currently available systems and methods of text analysis, and may facilitate the automated identification of topics in text documents, in a manner that is quicker, and more accurate than currently available systems, as elaborated herein (e.g., in relation to FIG. 6).

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of automatic topic detection in text by at least one processor, the method comprising:
receiving at least one first text document of a first plurality of text documents, wherein the first plurality of documents pertains to a first business domain;
extracting one or more phrases from the first text document, each phrase comprising one or more words, based on one or more syntactic patterns;
for each phrase:
applying a word embedding neural network (NN) on one or more words of the phrase, to obtain one or more respective word embedding vectors;
calculating a weighted phrase embedding vector, based on the one or more word embedding vectors; and
computing a phrase saliency score, based on the weighted phrase embedding vector, wherein the computing a phrase saliency score comprises:
arranging the one or more phrases as vertices in an undirected phrase graph, wherein each pair of vertices is connected by an edge;
for one or more edges, computing a similarity weight that represents semantic similarity between two phrases of corresponding connected vertices;
assigning a similarity weight that represents semantic similarity between two phrases by calculating a cosine similarity value between word embedding vectors of the two phrases and attributing the cosine similarity value as a similarity weight to an edge that connects the vertices of the two phrases; and
for each phrase, computing a phrase saliency score, based on the similarity weights of the connected edges;
producing one or more topic labels, representing one or more respective topics of the at least one first text document, based on the computed phrase saliency scores, wherein the producing one or more topic labels comprises:
obtaining a plurality of phrases, and a respective plurality of phrase saliency scores from the first plurality of documents;
selecting a first subset of the plurality of phrases, corresponding to the top phrase saliency scores; and
clustering the subset of phrases into clusters, based on the calculated cosine similarity value, wherein each cluster represents a unique topic label; and
obtaining a second plurality of documents pertaining to at least one second business domain;
for each topic label:
calculating a foreground probability value, representing probability of the topic label to represent a topic comprised in the first plurality of documents;
calculating a background probability value, representing probability of the topic label to represent a topic comprised in one of the first plurality of documents and the second plurality of documents; and
calculating a relevance score, representing pertinence of the topic label to the first business domain, based on the foreground probability value and the background probability value.

2. The method of claim 1, wherein the one or more word embedding vectors are adapted to encode a meaning of the one or more corresponding words of the phrase.

3. The method of claim 1, wherein calculating a weighted phrase embedding vector comprises:
calculating, for each word of the phrase, a word weight value, based on frequency of appearance of the word in the first plurality of text documents; and
calculating the weighted phrase embedding vector as a weighted average of the relevant word embedding vectors, based on the relevant word weight values.

4. The method of claim 1, wherein computing a phrase saliency score is performed iteratively, wherein each iteration comprises:
computing a phrase saliency score of a first phrase, based on: (a) the similarity weights of edges connected to the respective vertex, and (b) a phrase saliency score of at least one second phrase; and
updating the phrase saliency score of the at least one second phrase, based on the computed phrase saliency score of the first phrase.

5. The method of claim 1, wherein calculating a foreground probability value comprises:
performing a fuzzy search of the topic label, to count a number N1 of documents of the first plurality of documents that comprise the relevant topic; and
calculating the foreground probability value as a ratio between N1 and a number of documents included in the first business domain.

6. The method of claim 1, wherein calculating a background probability value comprises:
performing a fuzzy search of the topic label, to count a number N2 of documents of the first plurality of documents and the second plurality of documents, that comprise the relevant topic; and
calculating the background probability value as a ratio between N2 and the number of documents included in the first business domain and the at least one second business domain.

7. The method of claim 1, further comprising:
receiving, via a user interface (UI) at least one query, in relation to a topic present in the first plurality of documents; and
producing a response to the query, based on the one or more topic labels.

8. The method of claim 1, further comprising:
receiving, via a user interface (UI) at least one query, in relation to a topic present in the first plurality of documents; and
producing a response to the query, based on the one or more topic labels and corresponding relevance scores.

9. A system for automatic topic detection in text, the system comprising: a non-transitory memory device, wherein modules of instruction code are stored, and at least one processor associated with the memory device, and configured to execute the modules of instruction code, whereupon execution of said modules of instruction code, the at least one processor is configured to:

receive a first text document of a first plurality of text documents wherein the first plurality of documents pertains to a first business domain;

extract one or more phrases from the first text document, each phrase comprising one or more words, based on one or more syntactic patterns;

for each phrase:
apply a word embedding neural network (NN) on one or more words of the phrase, to obtain one or more respective word embedding vectors;
calculate a weighted phrase embedding vector, based on the one or more word embedding vectors; and
compute a phrase saliency score, based on the weighted phrase embedding vector;

produce one or more topic labels, representing one or more respective topics of the at least one first text document, based on the computed phrase saliency score of each phrase;

obtain a second plurality of documents pertaining to at least one second business domain;

for each topic label:
calculate a foreground probability value, representing probability of the topic label to represent a topic comprised in the first plurality of documents;
calculate a background probability value, representing probability of the topic label to represent a topic comprised in one of the first plurality of documents and the second plurality of documents; and
calculate a relevance score, representing pertinence of the topic label to the first business domain, based on the foreground probability value and the background probability value.

10. The system of claim 9, wherein the at least one processor is configured to calculate a weighted phrase embedding vector by:
calculating, for each word of the phrase, a word weight value, based on frequency of appearance of the word in the first plurality of text documents; and
calculating the weighted phrase embedding vector as a weighted average of the relevant word embedding vectors, based on the relevant word weight values.

11. The system of claim 9, wherein the at least one processor is configured to compute a phrase saliency score by:
arranging the one or more phrases as vertices in an undirected phrase graph, wherein each pair of vertices is connected by an edge;
for one or more edges, computing a similarity weight that represents semantic similarity between two phrases of corresponding connected vertices; and
for each phrase, computing a phrase saliency score, based on the similarity weights of the connected edges.

12. The system of claim 11, wherein the at least one processor is configured to assign a similarity weight that represents semantic similarity between two phrases by:
calculating a cosine similarity value between word embedding vectors of the two phrases; and
attributing the cosine similarity value as a similarity weight to an edge that connects the vertices of the two phrases.

13. The method of claim 9, wherein the at least one processor is configured to calculate a foreground probability value by:
performing a fuzzy search of the topic label, to count a number N1 of documents of the first plurality of documents that comprise the relevant topic; and
calculating the foreground probability value as a ratio between N1 and a number of documents included in the first business domain.

14. The method of claim 9, wherein the at least one processor is configured to calculate a background probability value by:
performing a fuzzy search of the topic label, to count a number N2 of documents of the first plurality of documents and the second plurality of documents, that comprise the relevant topic; and
calculating the background probability value as a ratio between N2 and the number of documents included in the first business domain and the at least one second business domain.

15. The method of claim 9, wherein the at least one processor is configured to:
receive, via a UI, at least one query, in relation to a topic present in the first plurality of documents; and
produce a response to the query, based on the one or more topic labels and corresponding relevance scores.

* * * * *